(12) United States Patent
Ben David et al.

(10) Patent No.: US 9,016,957 B2
(45) Date of Patent: Apr. 28, 2015

(54) INTEGRATED OPTICAL COOLING CORE FOR OPTOELECTRONIC INTERCONNECT MODULES

(71) Applicant: Mellanox Technologies Ltd., Yokneam (IL)

(72) Inventors: Ori Ben David, Tel Aviv (IL); Avner Badihi, D.N. Harey Yehuda (IL); Mordi Farkash, Haifa (IL); Kfir Katz, Kiryat Tivon (IL)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 14/294,167

(22) Filed: Jun. 3, 2014

(65) Prior Publication Data

US 2014/0369651 A1 Dec. 18, 2014

Related U.S. Application Data

(60) Provisional application No. 61/834,445, filed on Jun. 13, 2013.

(51) Int. Cl.
*G02B 6/36* (2006.01)
*G02B 6/42* (2006.01)

(52) U.S. Cl.
CPC ............ *G02B 6/4268* (2013.01); *G02B 6/4204* (2013.01); *G02B 6/4271* (2013.01); *Y10T 29/49117* (2013.01); *G02B 6/423* (2013.01); *G02B 6/4249* (2013.01); *G02B 6/4214* (2013.01); *G02B 6/4292* (2013.01); *G02B 6/4246* (2013.01)

(58) Field of Classification Search
CPC .... G02B 6/423; G02B 6/4204; G02B 6/4214; G02B 6/4246; G02B 6/4249; G02B 6/4268; G02B 6/4271; G02B 6/4292
USPC ............................................................ 385/89
See application file for complete search history.

(56) References Cited

U.S. PATENT DOCUMENTS

| | | | |
|---|---|---|---|
| 7,118,292 B2 | 10/2006 | Miao et al. | |
| 8,686,644 B2 | 4/2014 | Wootton | |
| 2005/0075573 A1* | 4/2005 | Park et al. | 600/459 |
| 2005/0201098 A1* | 9/2005 | DiPenti et al. | 362/294 |
| 2013/0294725 A1* | 11/2013 | Levy et al. | 385/33 |

OTHER PUBLICATIONS

GE Plastics, "ULTEM® Polyetherimide Resins", Product Guide, 52 pages. 2003.

* cited by examiner

*Primary Examiner* — Jerry Blevins
(74) *Attorney, Agent, or Firm* — D Kligler I.P. Services Ltd

(57) ABSTRACT

An apparatus includes one or more optoelectronic transducers, driving circuitry, one or more cooling elements, and a light coupling module. The optoelectronic transducers are configured to convert between optical signals conveyed over optical fibers and respective electrical signals. The driving circuitry is configured to process the electrical signals. The cooling elements are configured to remove heat that is produced at least by the driving circuitry. The light coupling module is configured to couple the optical signals between the optical fibers and the optoelectronic transducers, and additionally serves as a baseplate for the cooling elements.

16 Claims, 12 Drawing Sheets

INTEGRATED OPTICAL COOLING CORE FOR OPTOELECTRONIC INTERCONNECT MODULES

CROSS-REFERENCE TO RELATED APPLICATIONS

This application claims the benefit of U.S. Provisional Patent Application 61/834,445, filed Jun. 13, 2013, whose disclosure is incorporated herein by reference.

FIELD OF THE INVENTION

The present invention relates generally to optical interconnects, and particularly to methods and devices for thermal management in optical interconnects.

BACKGROUND OF THE INVENTION

Optoelectronic interconnect modules typically comprise optical emitters and receivers, such as vertical-cavity surface-emitting lasers (VCSEL) and photo detectors (PD). The optoelectronic module components may generate large heat densities such that heat dissipation in the modules is necessary for maintaining good performance. Various thermal management schemes for optical interconnect modules are known in the art.

For example, U.S. Pat. No. 7,118,292, whose disclosure is incorporated by reference, describes an optoelectronic module adapted to be coupled with an optical fiber on a first side and a plurality of electrical conductors on a second side. The optoelectronic module includes a header with a plurality of pins extending through the header a thermo-electric cooler with a hot plate of the thermo-electric cooler disposed against a second, opposing side of the header and a plurality of active and passive optical components adapted to convert between an optical signal format within the optical fiber and an electrical signal format within at least one conductor of the plurality of conductors, said plurality of active and passive optical components all being in thermal contact with a cold plate of the thermo-electric cooler.

U.S. Pat. No. 8,686,644, whose disclosure is incorporated by reference, describes a light generating system comprising: a plurality of solid state emitters (SSEs) and a stability control system for controlling the spectral stability of the SSEs. In a particular case, the stability control system may comprise: a power regulator to regulate power supplied to a sub-set of the plurality of SSEs; a constant current circuit connected to the power regulator to provide a constant current to the sub-set of SSEs; a current regulation set point connected to the constant current circuit; and a controller configured to set the regulation set point based on metrology relating to the state of the SSEs. In an embodiment, the plurality of SSEs comprise an encapsulant, and the light generator system further comprises a thermal management system configured to cool at least one of the encapsulant and the at least one solid state emitter.

SUMMARY OF THE INVENTION

An embodiment of the present invention that is described herein provides an apparatus including one or more optoelectronic transducers, driving circuitry, one or more cooling elements, and a light coupling module. The optoelectronic transducers are configured to convert between optical signals conveyed over optical fibers and respective electrical signals. The driving circuitry is configured to process the electrical signals. The one or more cooling elements are configured to remove heat that is produced at least by the driving circuitry. The light coupling module is configured to couple the optical signals between the optical fibers and the optoelectronic transducers, and additionally serves as a baseplate for the cooling elements.

In some embodiments, the light coupling module includes multiple optical coupling elements, each positioned between an end of an optical fiber and a respective optoelectronic transducer. In other embodiments, the optical coupling elements include at least one element type selected from a group of types consisting of a lens and a prism.

In some embodiments, the light coupling module, including the optical coupling elements, is formed of a single monolithic substrate material. In yet other embodiments, the light coupling module is formed of a monolithic substrate material, and the optical coupling elements are inserted into the light coupling module.

In some embodiments, the cooling elements include a thermoelectric cooler (TEC) that is coupled to one or more of the optoelectronic transducers. In other embodiments, the apparatus includes a thermally-conductive layer connecting the TEC to the one or more of the optoelectronic transducers.

In some embodiments, the cooling elements are fitted to the light coupling module during molding of the light coupling module. In other embodiments, the light coupling module is configured for serving as the baseplate for first and second different configurations of the cooling elements, having different first and second heat removal capabilities.

There is also provided, in accordance with an embodiment of the present invention, a method including providing one or more optoelectronic transducers, for converting between optical signals conveyed over optical fibers and respective electrical signals, and driving circuitry, for processing the electrical signals. One or more cooling elements are provided, for removing heat that is produced at least by the driving circuitry. The optoelectronic transducers and the cooling elements are integrated with a light coupling module, such that the light coupling module couples the optical signals between the optical fibers and the optoelectronic transducers, and additionally serves as a baseplate for the cooling elements.

The present invention will be more fully understood from the following detailed description of the embodiments thereof, taken together with the drawings in which:

DETAILED DESCRIPTION OF EMBODIMENTS

Overview

Parallel optics (PO) is an optical communication technology that multiplexes a high data rate electrical signal over multiple optical fibers. Embodiments of the present invention that are described herein provide improved optical interconnect modules that are suitable, for example, for PO applications. The disclosed interconnect modules are highly integrated, have a very small form factor, and at the same time are highly efficient in removing heat that is produced in the module.

In some embodiments, an optical interconnect module comprises one or more optoelectronic transducers, such as Vertical-Cavity Surface-Emitting Lasers (VCSELs) and/or Photo Detectors (PDs), for converting between optical signals conveyed over optical fibers and respective electrical signals. The electrical signals are amplified and otherwise processed by driving circuitry, such as VCSEL drivers and/or Trans-Impedance Amplifiers (TIAs).

When the optoelectronic transducers and driving circuitry are packaged in a small-size module, heat removal from the driving circuitry often becomes a major problem. The problem is especially severe in PO modules, in which the number of transducers is large and the driving circuitry thus generates a large amount of heat.

For example, PO optical interconnect modules for applications such as Infiniband EDR/25 Gbps-per-channel, the optoelectronic transducers and driving circuitry generate nominal power levels on the order of 500-700 mW per channel. With such power levels, heat removal is a major challenge.

Moreover, when designing an optical interconnect module, it is highly desirable to place the driving circuitry in close proximity to the optoelectronic transducers, in order to maintain high signal integrity. As a result, however, heat generated in the driving circuitry may increase the junction temperatures of the transducers and thus degrade their performance.

In order to resolve the above-described heat removal issues, the disclosed optical interconnect modules comprise cooling elements that are highly-integrated with the other elements of the optical interconnect module. In particular, the optical interconnect module typically comprises a light coupling module for coupling the optical signals between the optical fibers and the optoelectronic transducers. The light coupling module comprises light coupling elements such as micro-lenses or prisms. In the disclosed embodiments, this light coupling module additionally serves as a baseplate for the cooling elements. The resulting mechanical design is extremely compact and yet efficient in removing heat. The light coupling module is also referred to herein as an integrated optical cooling core.

In some example embodiments, the integrated optical cooling core may be formed by machining an optically transparent substrate material. Optical cooling towers are attached to the substrate, which conduct heat away from the high power driving circuitry. In other embodiments, the integrated optical cooling core is formed by inserting the cooling towers into the molten substrate.

When the heat-generating optoelectronic transducers and driving circuitry are then bonded to the integrated optical cooling core, the cooling elements conduct the heat efficiently to the exterior of the module. Optical alignment and coupling efficiency are also maintained between the optoelectronic transducers and the optical fibers via the optical coupling elements. Moreover, the configurations of the integrated optical cooling core also provides short electrical interconnect distances between the driving circuitry and the optoelectronic transducers, which is needed for high-speed signal integrity.

In the detailed description below, a breakdown of an exemplary optical interconnect module is first presented, which uses an integrated optical cooling core that illustrates a first embodiment of the present invention. In other embodiments of the integrated optical cooling core, active cooling, such as using a thermoelectric cooler (TEC), is implemented in the integrated optical cooling core in conjunction with high thermal conduction layers from the TEC to the optoelectronic transducers to maintain a constant temperature on the optical transducers. In yet other embodiments, different cooling tower configurations with one or two cooling pedestals are implemented for removing heat for multiple driver amplifiers.

Using the integrated optical cooling core as an approach to fabricating optical interconnect modules as taught herein significantly improves the efficiency of heat removal from the optoelectronic transducer and driving circuitry, and enable short electrical interconnects, which reduce size and improve overall performance. The disclosed techniques also improve the yield in the manufacturing of multiple-fiber, parallel optical interconnects modules, which reduces fabrication costs.

Optical Interconnect Module

Figure 1A:
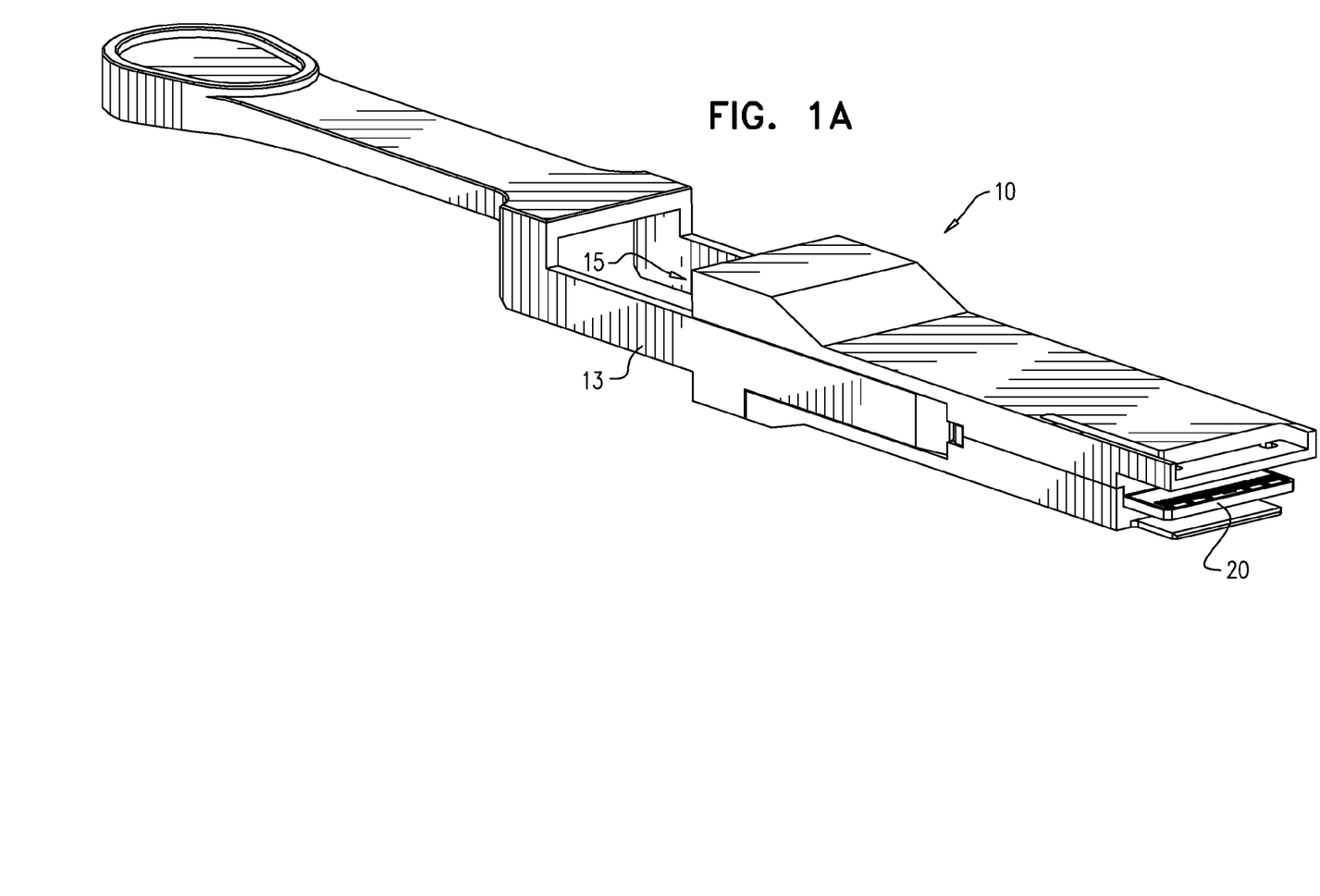
FIGS. 1A and 1B are isometric views of an optical interconnect module, in accordance with an embodiment of the present invention.
Figure 1B:
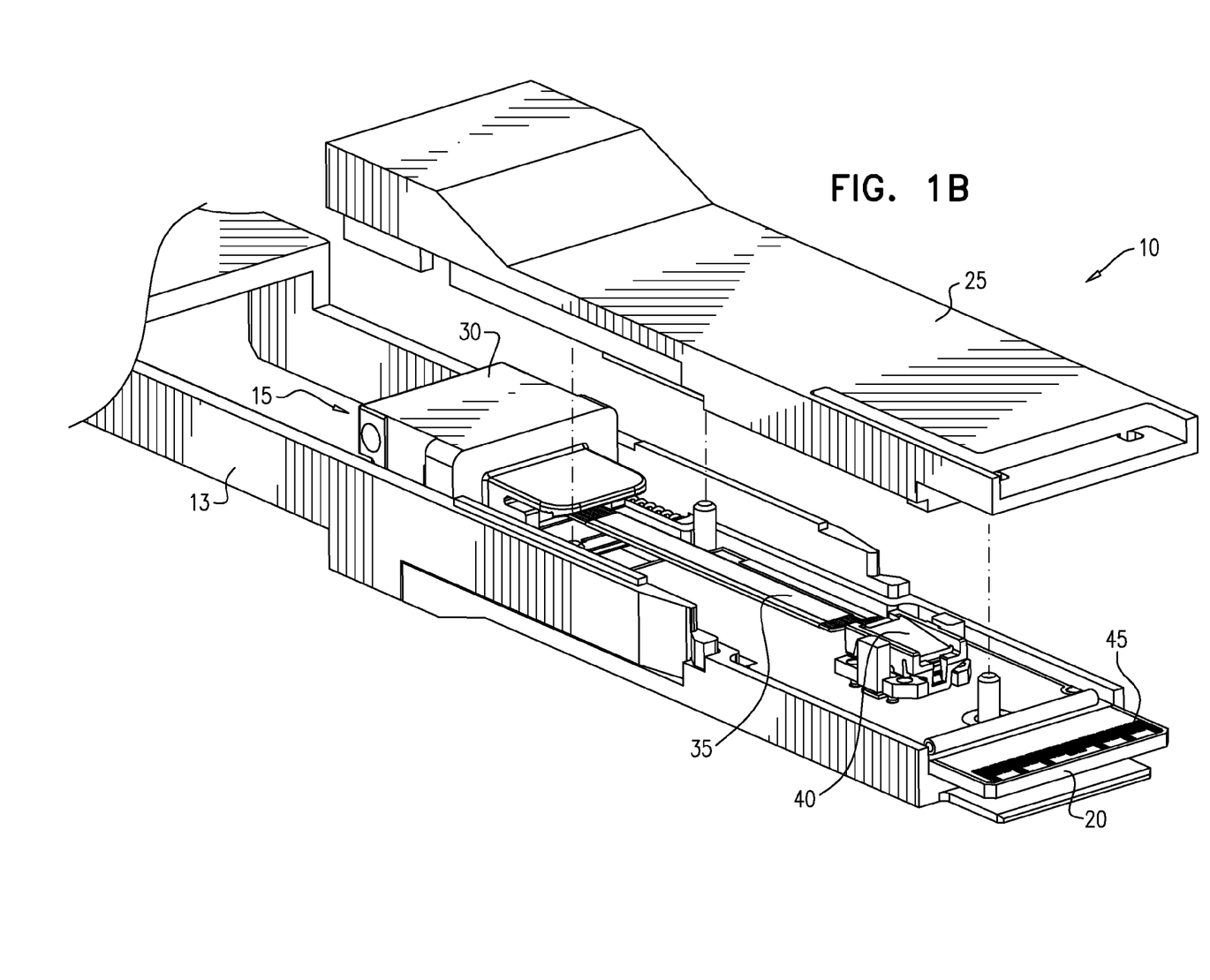

FIGS. 1A and 1B are drawings that illustrate an optical interconnect module 10, in accordance with an embodiment of the present invention. In FIG. 1A, module comprises a multi-fiber optical ferrule opening 15 formed into a module housing 13 for inserting a ferrule into module 10. The ferrule connector couples multiple fibers within any external optical cable (not shown), which is connected to module 10. Module 10 is configured to convert between modulated optical signals (conveyed in the fibers connected to housing 13 through opening 15) and high-speed electrical signals. The electrical signals are then conveyed via a printed circuit board (PCB) connector port 20, which is connected into any suitable communication equipment.

In FIG. 1B, a lid 25 of module 10 is removed. The optical ferrule is inserted in opening 15 into an optical ferrule holder 30, which is configured to couple the light in multiple optical ports in the ferrule into a multi-fiber internal optical cable 35, comprising multiple optical fibers. The light in cable 35 is further coupled to a parallel optical interface (POI) 40. POI 40 converts between the modulated optical signals conveyed over the fibers and electrical signals which are coupled to PCB board connector port 20 on a PCB 45. For best signal integrity, POI 40 is typically mounted in module 10 as close as possible to port 20 so as to reduce the length of the electrical interconnects on PCB 45 from POI 40 to port 20.

In general, there are three basic methods for removing heat away from the heat source: conduction, convection and radiation. The embodiments of the present invention described herein relate to methods of heat removal from POI 40 typically by conduction to module housing 13, or by active cooling as will be described later. Module housing 13 may comprise any suitable material or any suitable means for dissipating heat away from POI 40, in addition to providing mechanical support for the components of module 10.

Figure 2:
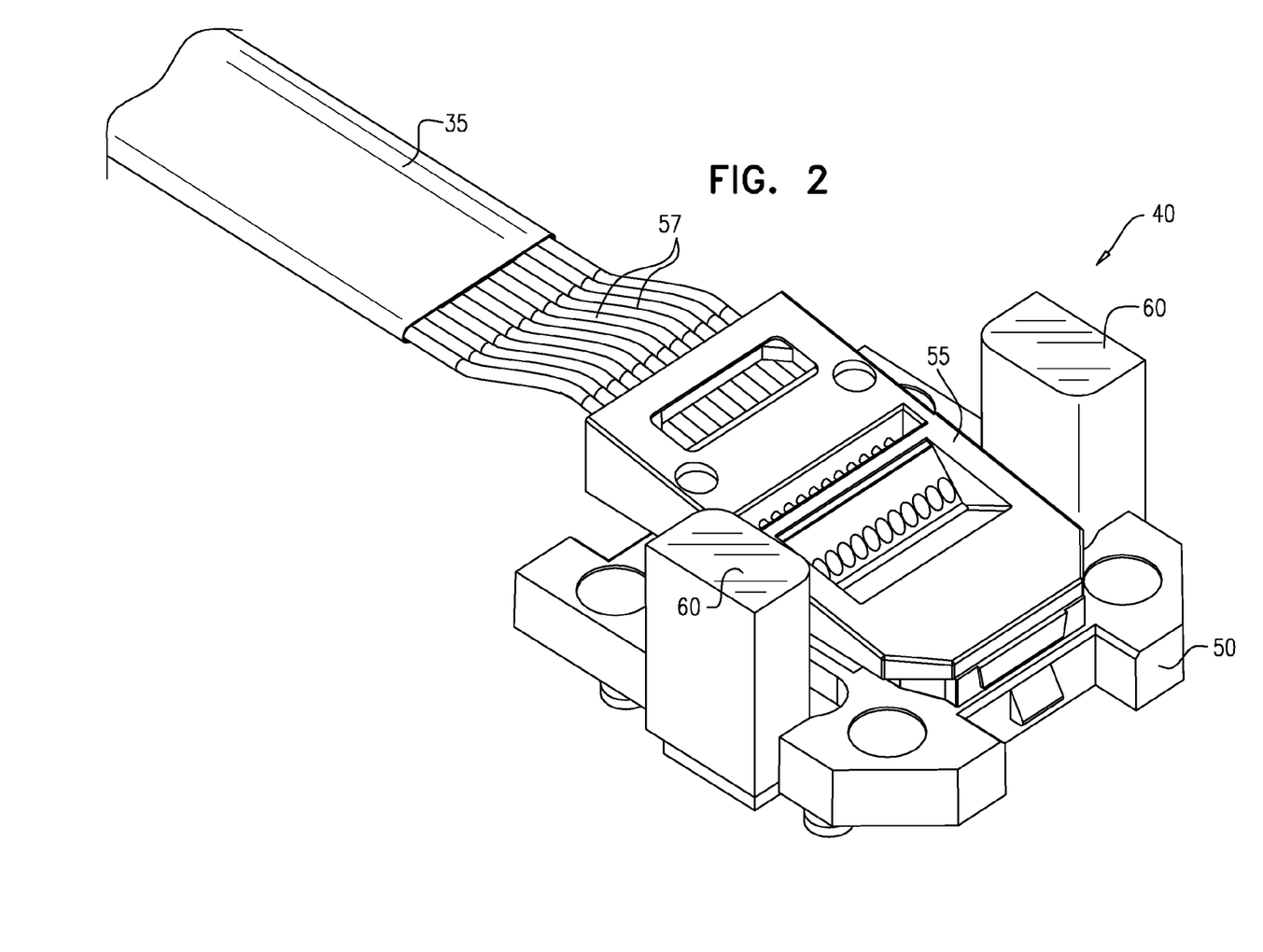
FIG. 2 is an isometric view of a parallel optical interface, in accordance with an embodiment of the present invention.

FIG. 2 is a drawing that illustrates an enlarged view of parallel optical interface 40, in accordance with an embodiment of the present invention. Parallel optical interface 40 comprises a substrate 50 on which optoelectronic devices and circuitry are bonded to the backside (not shown) and an optical rotation module 55 is mounted on the top side. Internal optical cable 35 comprises individual fibers 57. Twelve fibers are shown in this exemplary embodiment of FIG. 2. Alternatively, however, any other suitable number of fibers (also referred to as channels) may be used.

Optical rotation module 55 is configured to rotate the light in fibers 57 at 90°, downward toward substrate 50 to couple light to the optoelectronic transducers (as will be shown in later figures). Two cooling towers 60 are connected to substrate 50 and will be described later. In some embodiments, optical rotation module 55 can be implemented, for example, by a PRIZM Light Turn Connector, U.S. Conec Ltd. (Hickory, N.C.). Alternatively, however, any other suitable fiber connector can be used for this purpose.

Cooling Apparatus for a Parallel Optical Interface

Figure 3A:
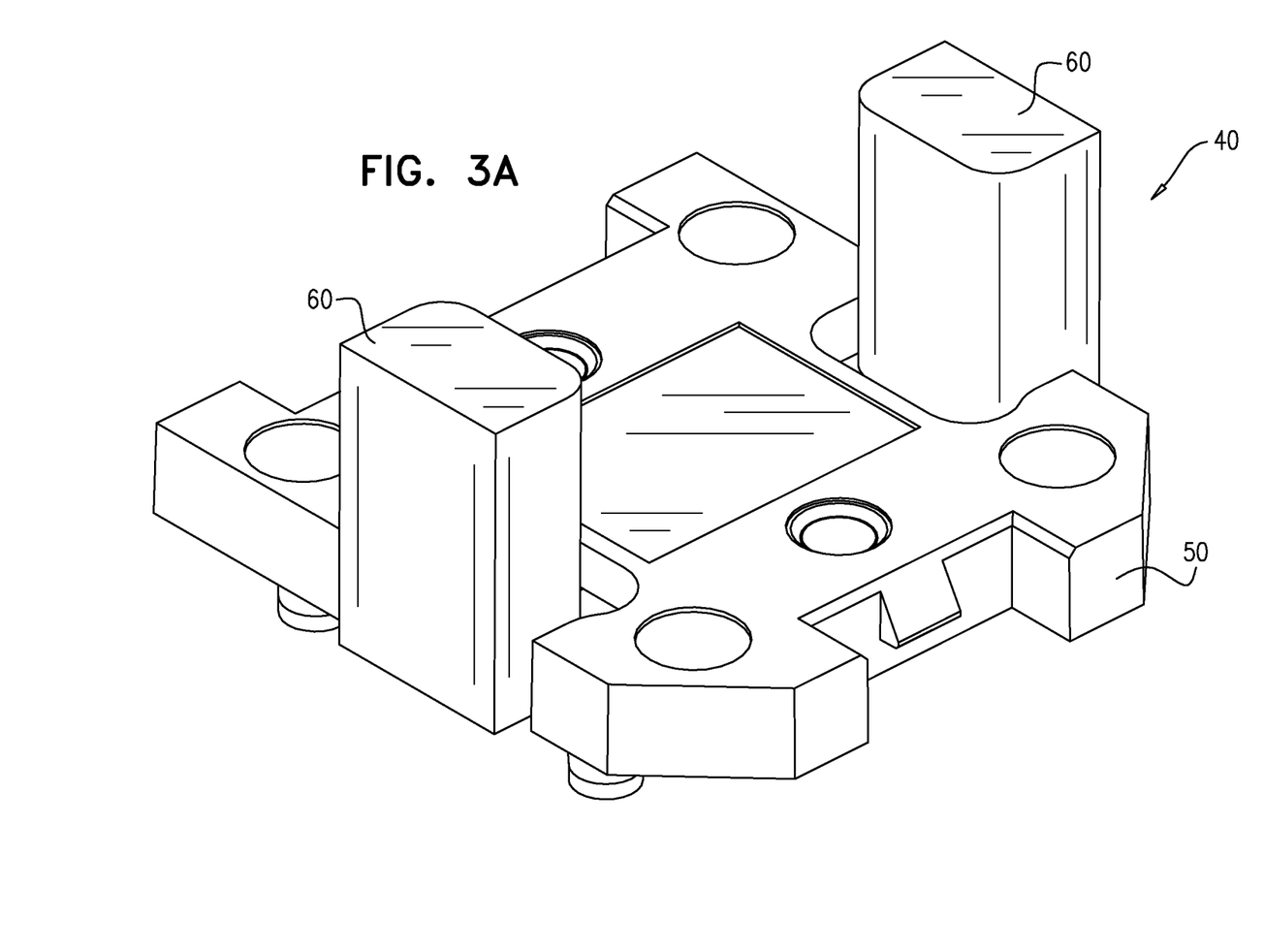
FIGS. 3A and 3B are isometric views of a parallel optical interface, in accordance with an embodiment of the present invention.
Figure 3B:
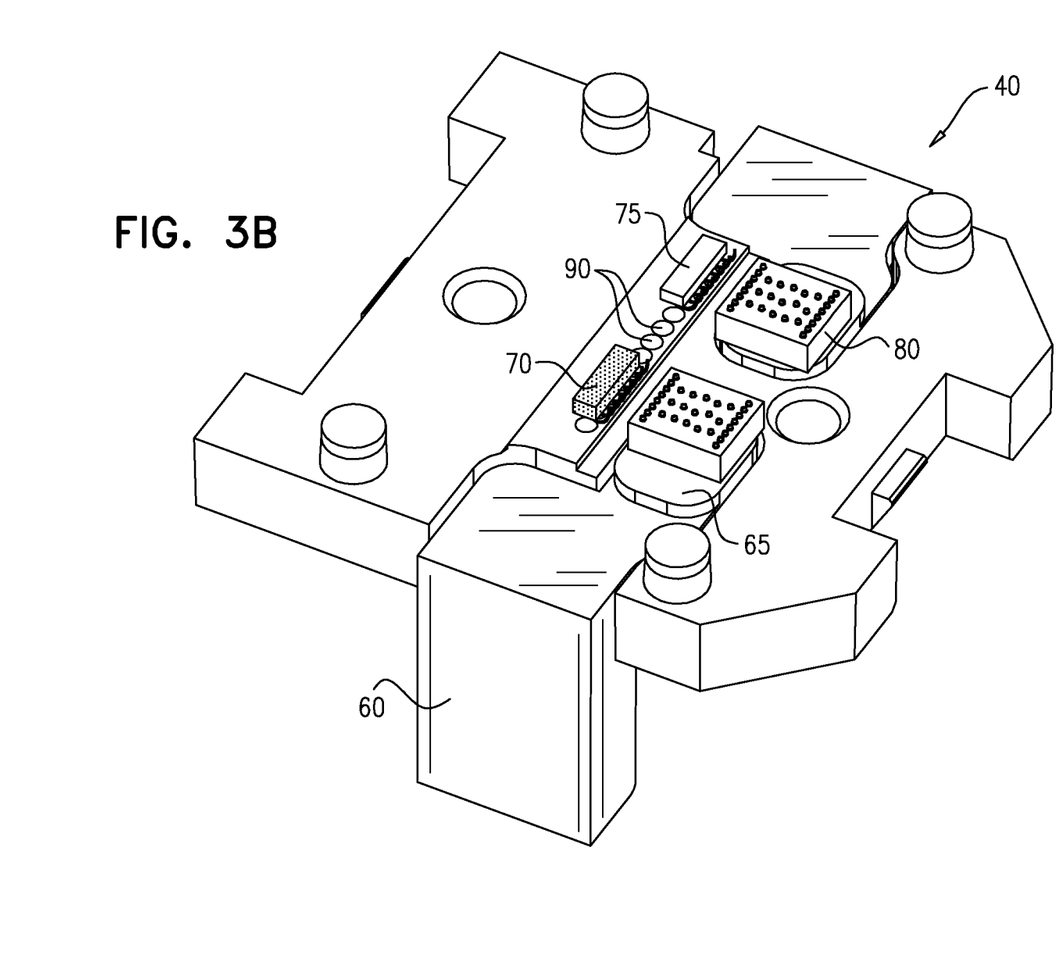

FIGS. 3A and 3B are drawings that illustrate top view and bottom views, respectively, of parallel optical interface 40 without optical rotation module 55, in accordance with an embodiment of the present invention. Cooling towers 60 are shown in both FIGS. 3A and 3B. Cooling towers 60 are typically machined from copper to have pedestals 65 as seen on the bottom view of interface in FIG. 3B. Pedestals 65 are used to remove heat by conduction from semiconductor dies bonded onto pedestals 65 to the ambient environment via the cooling towers.

The optoelectronic (OE) transducers described herein typically comprise photo-detectors (PD) and vertical cavity surface emitting lasers (VCSEL). The OE transducers are formed on dies typically arranged in an array so as to couple light efficiently between the transducers and optical fibers 57 in module 10. The dies may be formed from any suitable semiconductor, such as Gallium Arsenide (GaAs).

In the embodiment shown in FIG. 3B, a photo-detector (PD) die 70 and a vertical cavity surface emitting laser (VCSEL) die 75 are mounted above an array of multiple optical coupling elements 90. Generally, the term "optical coupling elements" used herein may comprise a lens, a prism, a through substrate hole, or any suitable optical element that assists in coupling light efficiently between optical fibers in the fiber connector and the array of optoelectronic transducers.

In some embodiments, optical coupling elements 90 may be formed directly in substrate 50. In these embodiments, substrate 50 is formed as a single monolithic block of substrate material, including optical coupling elements 90. In alternative embodiments, optical coupling elements 90 are attached to or inserted into substrate 50. Optical coupling elements may be formed, for example, by etching or molding glass, silicon, or plastic substrates, such as, for example, polystyrene (PS), polymethyl methacrylate (PMMA), cyclic olefin copolymer (COC), polyether imide (PEI) and polycarbonate (PC).

In this embodiment, substrate 50 is an example of a light coupling module that serves a dual purpose coupling light between the EO transducers and the optical fibers, and serving as a baseplate for cooling towers 60. In some embodiments, optical rotation module 55 is also fabricated, e.g., monolithically, as part of substrate 50.

In other embodiments, optical rotation module 55 is configured to rotate the light from multiple fibers 57 and couple the light to the optoelectronic transducers as described previously (e.g., using U.S. Conec PRIZM Light Turn Connector). Any suitable design of optical rotation module 55 may be used and co-optimized in conjunction with the design of optical coupling elements 90 so as to maximize the coupling efficiency of light between the fibers and optoelectronic transducers.

Optical driver dies 80 comprise driving circuitry, such as VCSEL drivers for driving the VCSELs on VCSEL die and Trans-Impedance Amplifiers (TIAs) for amplifying the signals produced by the PDs on PD die 70. Driver dies 80 may be formed in any suitable semiconductor, such as silicon complementary metal oxide semiconductor (Si-CMOS). Driver dies 80 typically generate the most heat in module 10 and are thus bonded directly onto pedestals 65 to improve heat conductive heat dissipation through cooling towers 60.

Figure 3C:
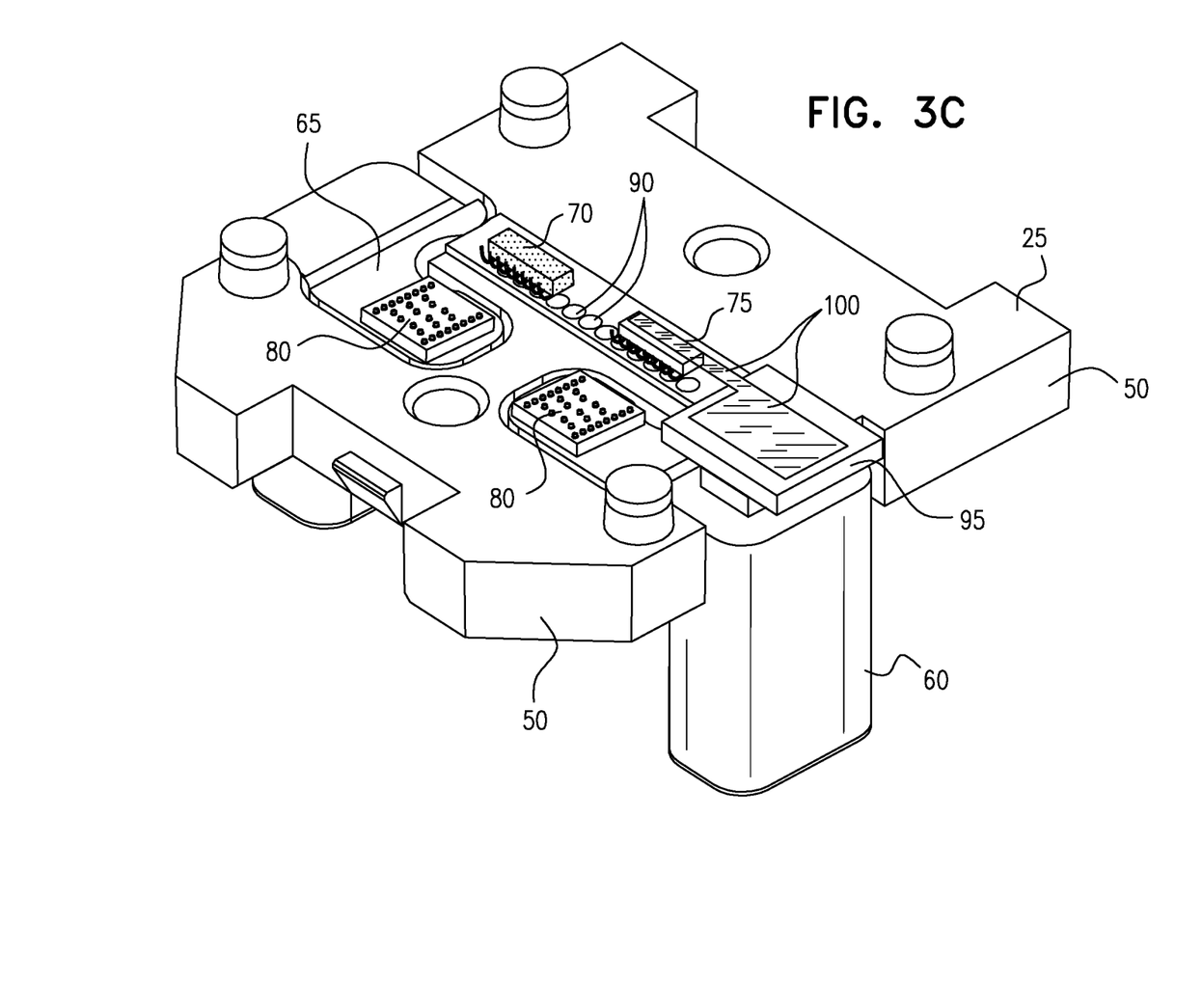
FIG. 3C is an isometric view of a parallel optical interface with active cooling, in accordance with an embodiment of the present invention.

FIG. 3C is a drawing that illustrates parallel optical interface 40 with active cooling, in accordance with another embodiment of the present invention. VCSEL devices in die 75 are typically highly sensitive to temperature changes. In some cases, the ability of cooling towers 60 to remove the heat generated by VCSEL die 75 and driver dies 80 is limited and additional heat dissipation schemes are required. In some embodiments, additional heat removal is assisted by active cooling. A micro thermo-electric cooler (TEC) 95 is bonded to right pedestal 65 as shown in FIG. 3C.

A high thermal conductive layer 100 is used to shunt the heat generated by VCSEL die 75 to TEC 95. TEC 95 provides active cooling typically using the Peltier effect to pump the heat from VCSEL die 75 to cooling tower 60 through layer 100 by passing current through TEC 95. High thermal conducting layer 100 may be formed by any suitable material, such as synthetic diamond, for example. As a result, the VCSEL devices in die 75 can be maintained at a constant temperature for optimal performance. Additionally or alternatively, a similar active cooling mechanism may be used for cooling PD die 70.

Integrated Optical Cooling Core

As the number of fibers handled by parallel optical interface 40 increases, each fiber operating with its own optoelectronic transducer and driver circuitry, heat generation in module 10 increases considerably. Moreover, high speed signal integrity considerations require short electrical interconnects between the optoelectronic transducer dies and optical driver circuitry dies as previously mentioned. This further reduces the size (e.g., form factor) of parallel optical interface 40, which increases the heat density.

If module 10 does not effectively dissipate the heat, large temperature increases occur over the module volume. Consequently, this results in higher junction temperatures in the VCSEL and PD devices, as well as the driver circuitry, which impairs optical transceiver operation. Moreover, heating of the array of optical coupling elements 90 may also cause thermal deformations in the optical coupling array resulting in increased coupling mismatches between the optoelectronic transducers (e.g., dies 70 and 75) and optical fibers 57 further degrading performance of parallel optical interface 40.

In the embodiments of the present invention, the thermal design of optical interconnect module 10 is significantly improved by integrating the optical coupling elements (e.g., lens or prisms) with the conductive cooling towers. This approach significantly improves heat removal from the high power components in the smaller form factor optical interconnect modules required by signal integrity considerations as described previously.

Figures 4A, 4B:
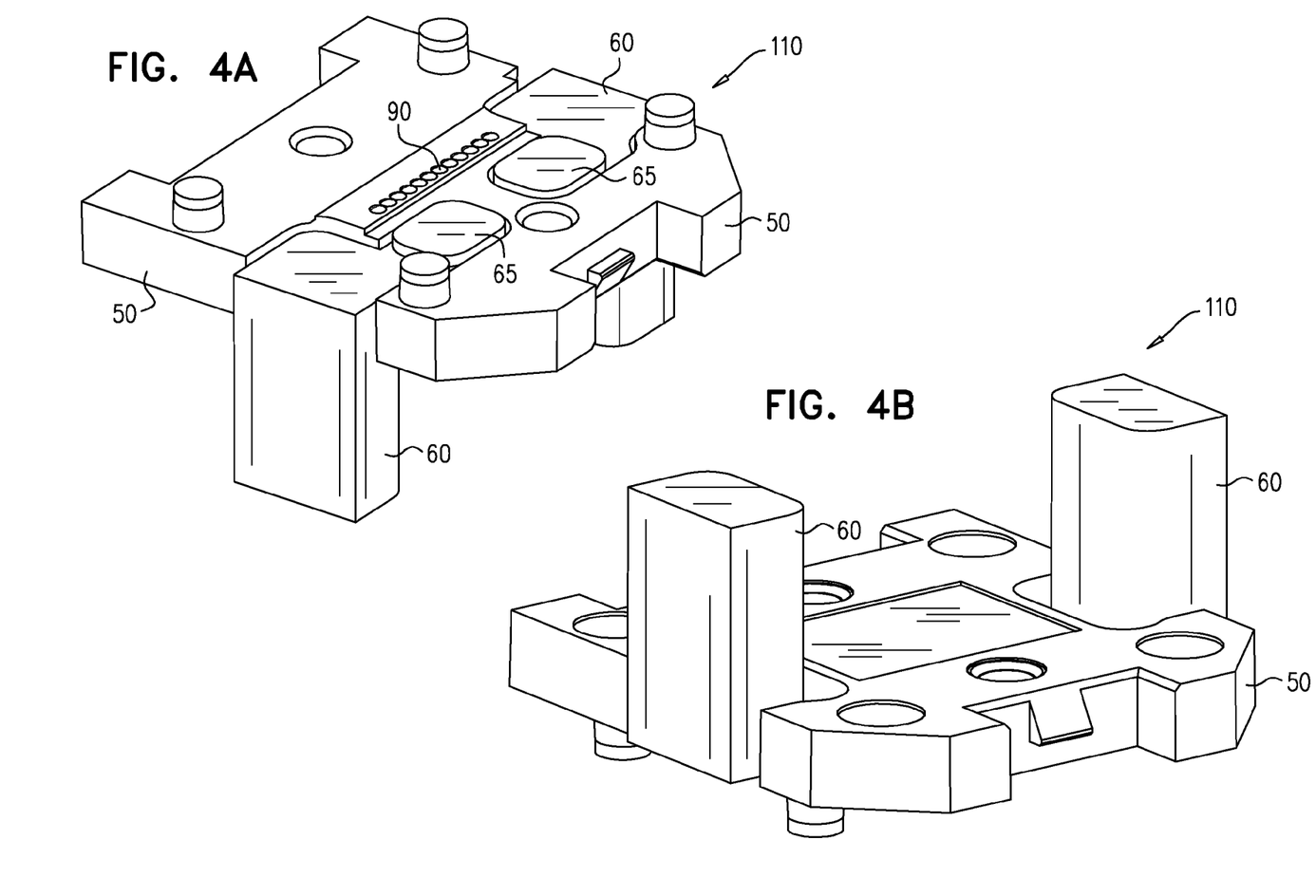
FIGS. 4A and 4B are isometric views of an integrated optical cooling core (IOCC), in accordance with an embodiment of the present invention.

FIGS. 4A and 4B are drawings that respectively illustrate a bottom view and a top view of an integrated optical cooling core (IOCC) 110, in accordance with an embodiment of the present invention. IOCC 110 is the main building block of parallel optical interface 40. The figure shows cooling towers 60 and an array of multiple optical coupling elements 90 integrated on substrate 50.

Cooling towers 60 conduct heat away from the high power devices attached to pedestals 65 (e.g., from dies 80, not shown in this figure). In addition, by placing pedestals 65 next to the array of optical coupling elements 90, heat removal from the array of optical coupling elements 90 is also improved to reduce heat deformation of the array. Heat removal can be further enhanced by active cooling (e.g., TEC 95) as described previously.

Substrate 50 can be formed from any suitable material, such as, for example, ULTEM2000 thermoplastic from GE Plastics (Pittsfield, Mass.), or any other suitable substrate material, such as the materials stated previously for forming the optical coupling elements. In some embodiments, integrated optical cooling core 110 may be formed by machining the substrate material with optical coupling elements 90 and attaching cooling towers 60 with pedestal 65 to substrate 50.

In other embodiments, IOCC 110 can be formed by overmolding, or injection molding, of the substrate material. The cooling towers with pedestals are inserted into the molten substrate material, and regions for attaching the active cooling devices can also be formed. Any suitable optical coupling elements 90 can be etched, molded, or machined into substrate 50 before or after cooling.

The methods taught herein can be applied to an optical interconnect module with a single channel, four channels (x4), twelve channels (x12) as shown in FIG. 2, or for any suitable number of channels. Optical alignment between the fibers and optoelectronic transducers in POI is independent of the presence of the integrated cooling towers. Hence, integrating the cooling towers in the parallel optical interface does not add additional assembly costs.

The following embodiments describe different configurations for thermal management in parallel optical interfaces by implementing an integrated optical cooling core. Each embodiment may be suitably adapted for any optical fiber connector and optical rotation module configuration. However, the same methods for fabricating a parallel optical interface with an integrated optical cooling core (as described previously in the embodiments of FIGS. 3A-3C and FIGS. 4A-4B) can be applied in the same manner to each of the following embodiments.

Figure 5A:
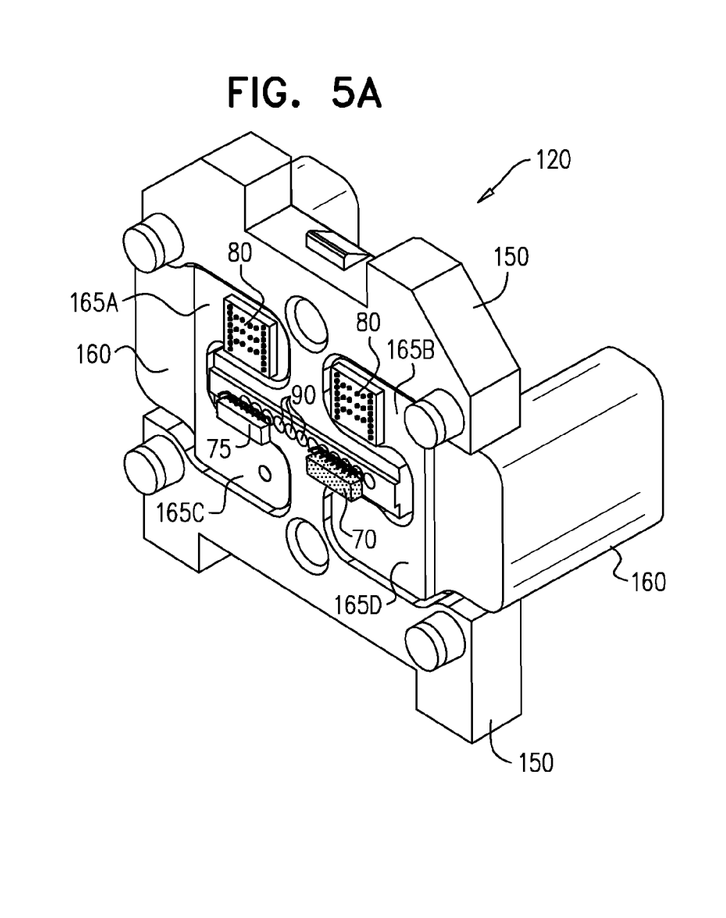
FIGS. 5A and 5B are isometric views illustrating two configurations of a parallel optical interface with cooling towers having two heat dissipation pedestals, in accordance with an embodiment of the present invention.
Figure 5B:
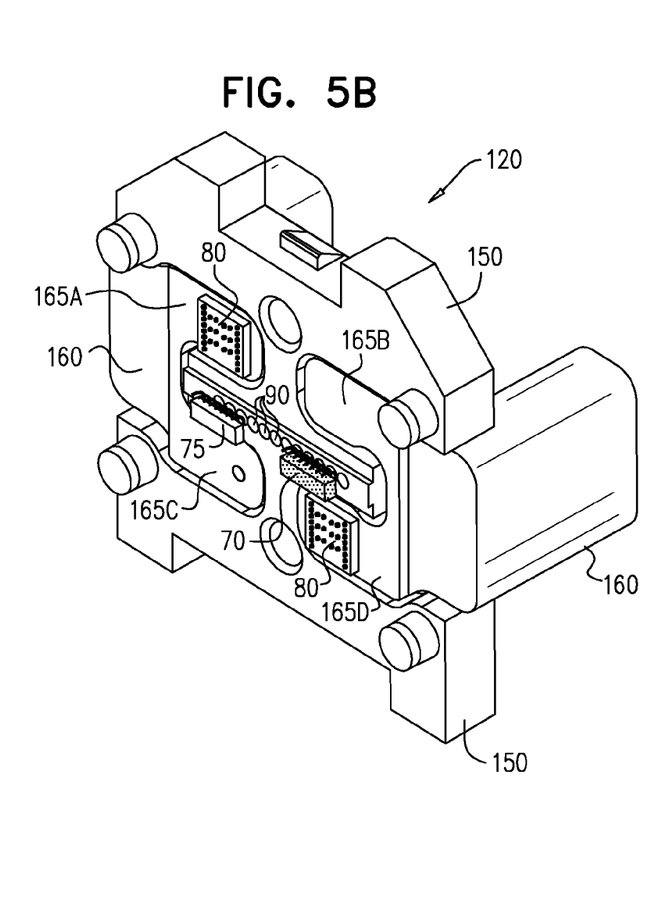

FIGS. 5A and 5B are drawings illustrating two configurations of a parallel optical interface 120 with cooling towers 160 with two heat dissipation pedestals 165, in accordance with an embodiment of the present invention. The left cooling tower has two pedestals 165A and 165C, whereas the right cooling tower has two pedestals 165B and 165D. Pedestals 165A and 165C wrap around the left side of the array of optical coupling elements 90. Pedestals 165B and 165D wrap around the right side of the array of optical coupling elements 90 with dies 70 and 75 attached to the array as shown in both FIGS. 5A and 5B.

The embodiments shown in FIGS. 5A and 5B provide additional locations for driver dies 80 with respect to optoelectronic transducer dies 70 and 75 for higher power application on a substrate 150. In one embodiment as shown in FIG. 5A, two driver chips 80 are mounted on pedestals 165A and 165B. In a second embodiment, two driver dies 80 are mounted on pedestals 165A and 165D. Substrate 150 is suitably configured to permit assembly of cooling tower 160 with double pedestals 165.

In other embodiments for lower power applications, substrate 150 can be used with cooling tower 60 with a single pedestal 65 as shown in the previous figures. This variability in placing driver dies in four potential locations (165A-165D) according to anticipated heat levels can reduce fabrication costs instead of the need to maintain multiple substrate configurations. In other words, the light coupling module formed by substrate 150 is configured to serve as baseplate for two different configurations of cooling towers, having different heat removal capabilities. Typical dimensions of parallel optical interface 120 is 8×4×8 mm (e.g., width×height×depth). Alternatively, however, other suitable dimensions can also be used.

Figure 6A:
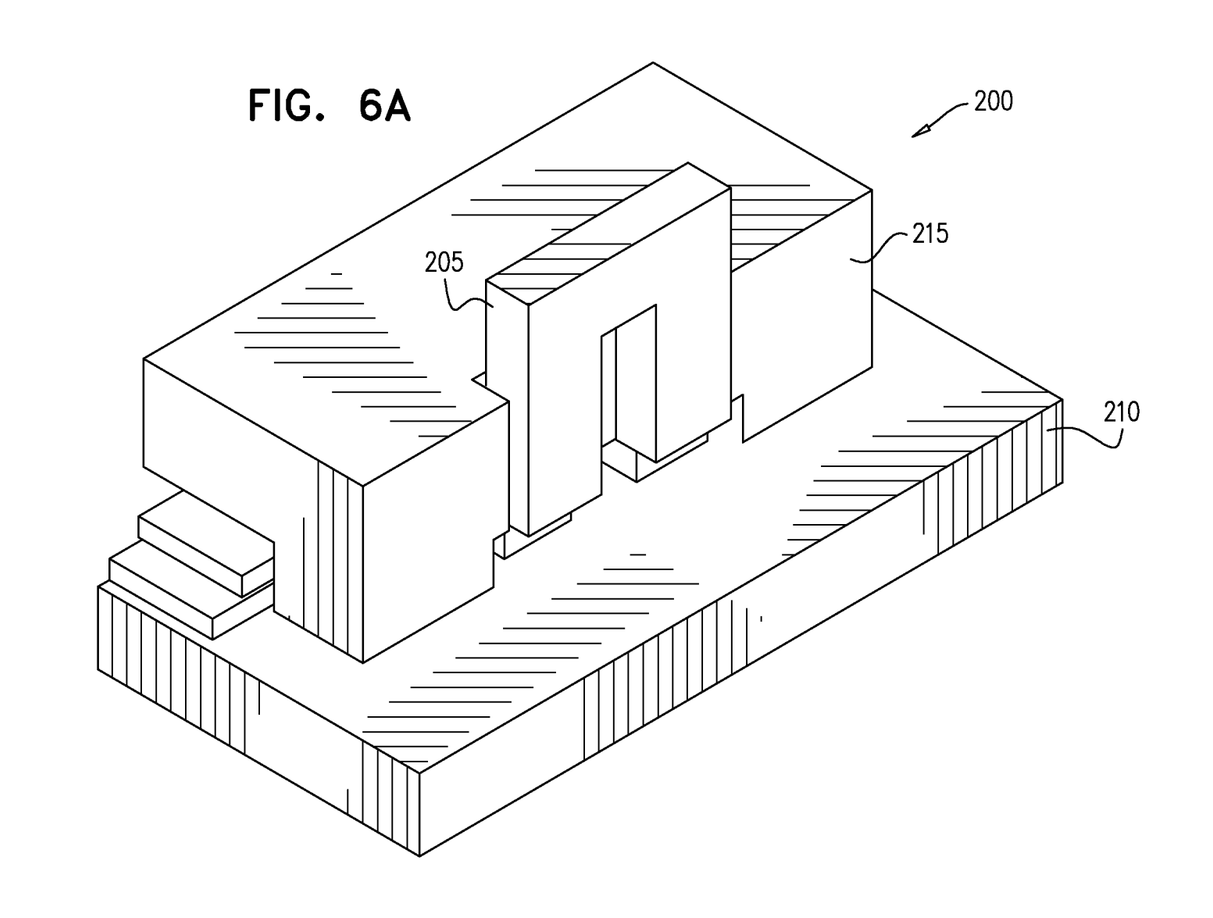
FIGS. 6A and 6B are schematic illustrations of a parallel optical interface with an inverted U-shaped cooling tower, in accordance with an embodiment of the present invention.
Figure 6B:
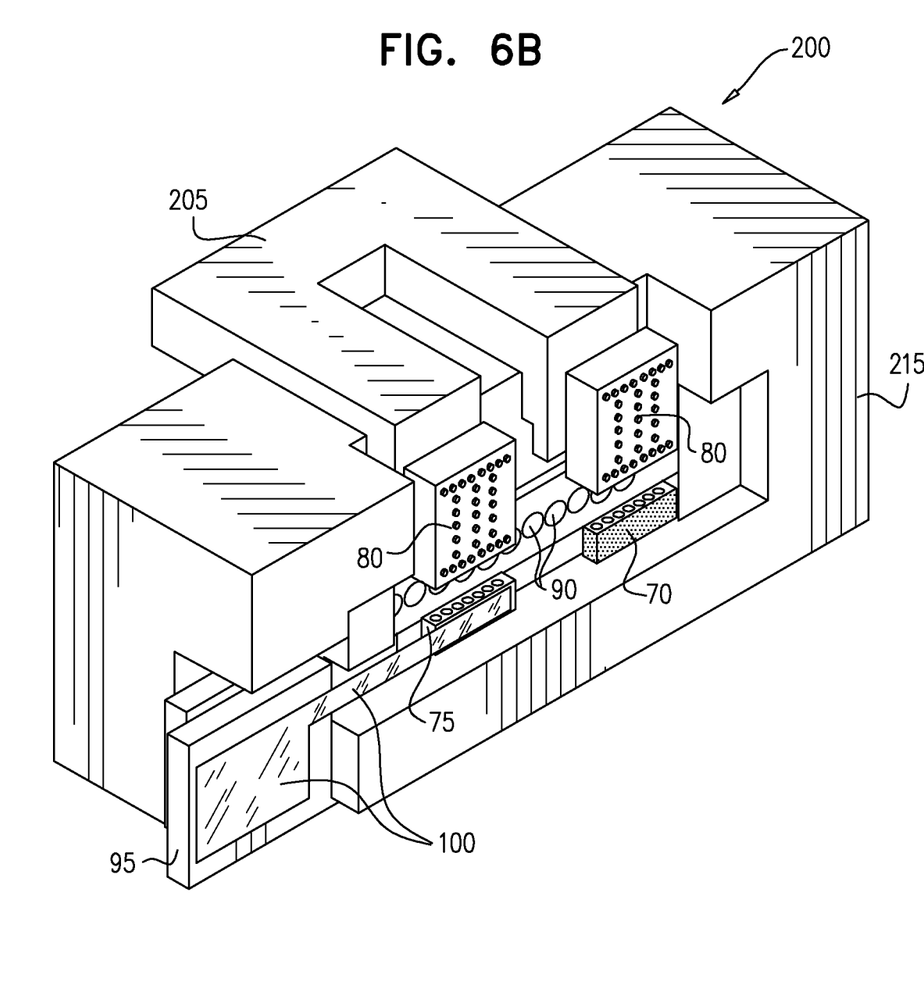

FIGS. 6A and 6B are drawings that illustrate a parallel optical interface 200 with an inverted U-shaped cooling tower 205, in accordance with an alternative embodiment of the present invention. Parallel optical interface 200 comprises a substrate 215 that is mounted on a printed circuit board (PCB) 210. In this embodiment, too, the substrate (or light coupling module) serves for both light coupling and as a baseplate for cooling elements.

FIG. 6B shows interface 200 without PCB 210 to illustrate the positioning of the various dies. Driver dies 80 are mounted directly on the faces of cooling tower 205. PD die 70 and VCSEL die 75 are mounted over optical coupling elements 90. TEC 95 is used to directly cool VCSEL die 75 via high thermal conducting layer 100.

Figure 7A:
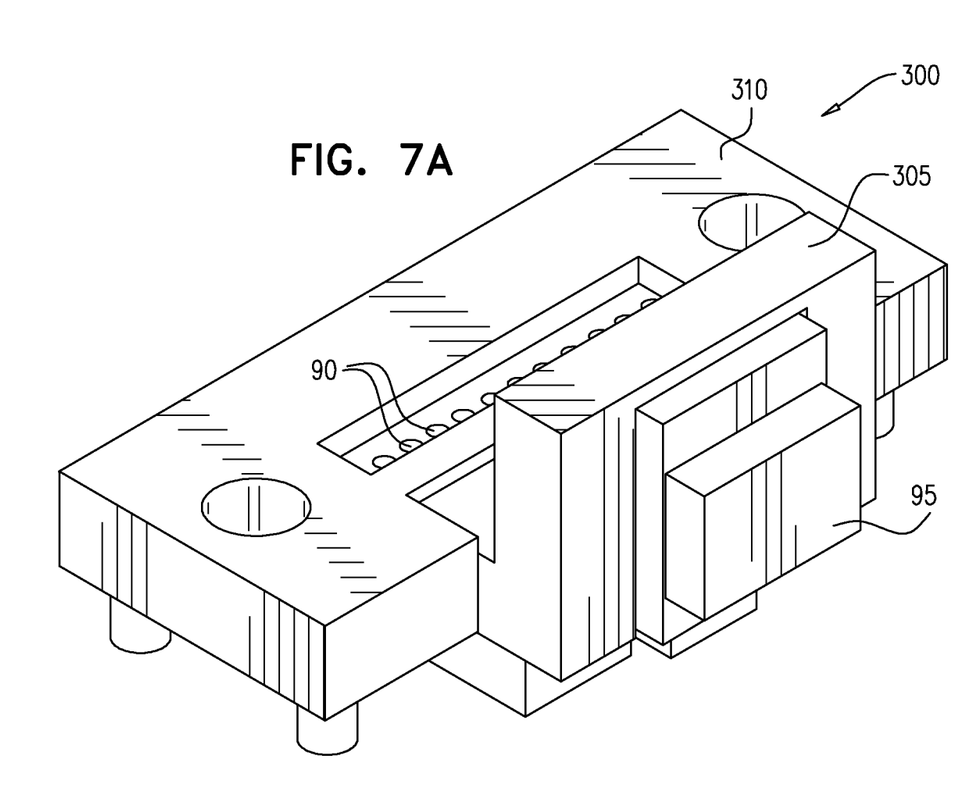
FIGS. 7A and 7B are schematic illustrations of a parallel optical interface with a solid cooling block, in accordance with an embodiment of the present invention.
Figure 7B:
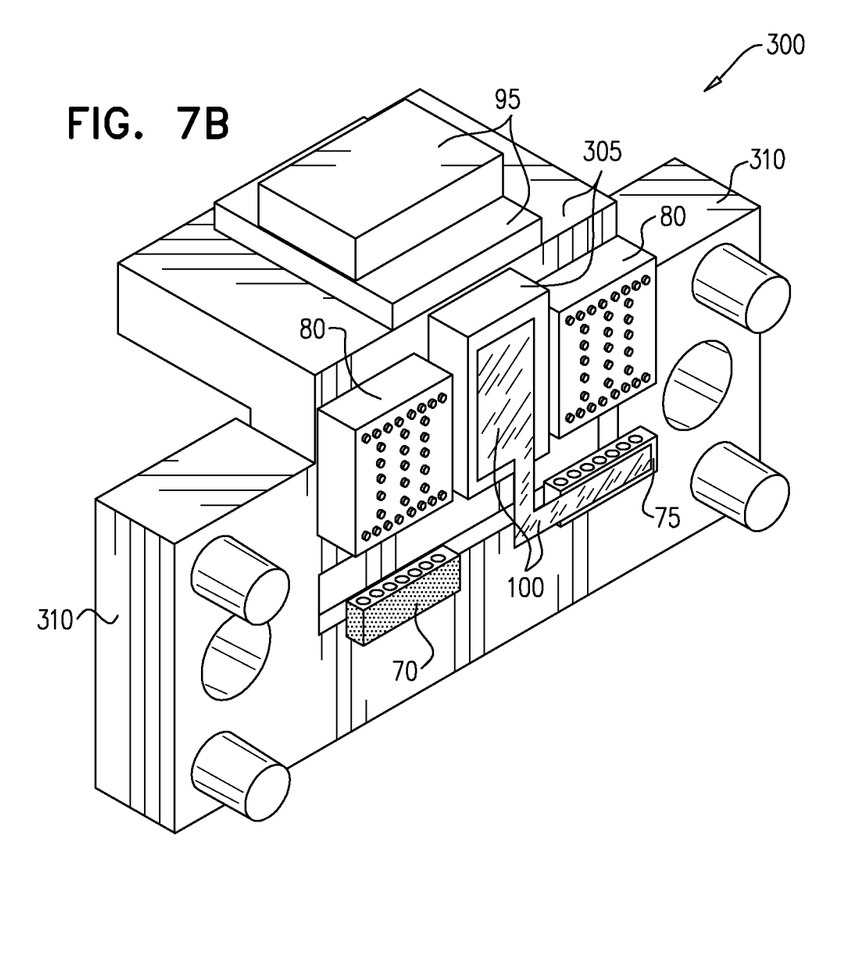

FIGS. 7A and 7B are drawings that illustrate a parallel optical interface 300 with a solid cooling block 305, in accordance with an embodiment of the present invention. Parallel optical interface 200 comprises a substrate 310. Driver dies 80 are mounted directly on the faces of cooling block 305. PD die 70 and VCSEL die 75 are mounted over optical coupling elements 90. TEC 95 is mounted on cooling block 305. TEC 95 used to directly cool driver dies 80, and to cool VCSEL die 75 via high thermal conducting layer 100, which is connected to cooling block 305 at one end of layer 100 and VCSEL die 75 at the other end of layer 100. In this example, the optical coupling elements comprise a flat lens array.

The embodiments described in all of the figures herein are merely for visual clarity to illustrate the implementation of an integrated optical cooling core for thermal management in optical interconnect modules, and not by way of limitation of the embodiments of the present invention. In alternative embodiments, any other suitable mechanical configuration and/or heat removal mechanism can be used.

Although the embodiments described herein mainly address fabrication of optical interconnect module, the methods and systems described herein can also be used in any other suitable optoelectronic module.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
one or more optoelectronic transducers, which are configured to convert between optical signals conveyed over optical fibers and respective electrical signals;
driving circuitry, which is configured to process the electrical signals;
one or more cooling elements, which are configured to remove heat that is produced at least by the driving circuitry; and
a light coupling module, which is configured to couple the optical signals between the optical fibers and the optoelectronic transducers, and which additionally serves as a baseplate for first and second different configurations of the cooling elements having different first and second heat removal capabilities.

2. The apparatus according to claim 1, wherein the light coupling module comprises multiple optical coupling elements, each positioned between an end of an optical fiber and a respective optoelectronic transducer.

3. The apparatus according to claim 2, wherein the optical coupling elements comprise at least one element type selected from a group of types consisting of a lens and a prism.

4. The apparatus according to claim 2, wherein the light coupling module, including the optical coupling elements, is formed of a single monolithic substrate material.

5. The apparatus according to claim 2, wherein the light coupling module is formed of a monolithic substrate material, and wherein the optical coupling elements are inserted into the light coupling module.

6. The apparatus according to claim 1, wherein the cooling elements comprise a thermoelectric cooler (TEC) that is coupled to one or more of the optoelectronic transducers.

7. The apparatus according to claim 6, and comprising a thermally-conductive layer connecting the TEC to the one or more of the optoelectronic transducers.

8. The apparatus according to claim 1, wherein the cooling elements are fitted to the light coupling module during molding of the light coupling module.

9. A method, comprising:
providing one or more optoelectronic transducers, for converting between optical signals conveyed over optical fibers and respective electrical signals, and driving circuitry, for processing the electrical signals;
providing one or more cooling elements, for removing heat that is produced at least by the driving circuitry; and
integrating the optoelectronic transducers and the cooling elements with a light coupling module, such that the light coupling module couples the optical signals between the optical fibers and the optoelectronic transducers, and additionally serves as a baseplate for first and second different configurations of the cooling elements having different first and second heat removal capabilities.

10. The method according to claim 9, wherein the light coupling module comprises multiple optical coupling elements, and wherein integrating the optoelectronic transducers with the light coupling module comprises positioning the optical coupling elements between ends of the optical fibers and the respective optoelectronic transducers.

11. The method according to claim 10, wherein the optical coupling elements comprise at least one element type selected from a group of types consisting of a lens and a prism.

12. The method according to claim 10, and comprising forming the light coupling module, including the optical coupling elements, of a single monolithic substrate material.

13. The method according to claim 10, and comprising forming the light coupling module of a monolithic substrate material, and inserting the optical coupling elements into the light coupling module.

14. The method according to claim 9, wherein integrating the cooling elements comprises coupling a thermoelectric cooler (TEC) to one or more of the optoelectronic transducers.

15. The method according to claim 14, wherein coupling the TEC comprises connecting the TEC to the one or more of the optoelectronic transducers with a thermally-conductive layer.

16. The method according to claim 9, wherein integrating the cooling elements with the light coupling module comprises fitting the cooling elements to the light coupling module during molding of the light coupling module.

* * * * *